United States Patent [19]
Howell

[11] Patent Number: 6,091,402
[45] Date of Patent: Jul. 18, 2000

[54] FOOT OPERATED INPUT DEVICE

[75] Inventor: Matthew G. Howell, Nampa, Id.

[73] Assignee: Micron Electronics, Inc., Nampa, Id.

[21] Appl. No.: 08/992,639

[22] Filed: Dec. 17, 1997

[51] Int. Cl.$^7$ ................................................ G09G 5/00
[52] U.S. Cl. ........................ 345/157; 345/163; 345/173
[58] Field of Search ................................ 345/156, 163, 345/167, 173, 157; 463/36, 38, 6

[56] References Cited

U.S. PATENT DOCUMENTS

| | | | |
|---|---|---|---|
| 3,834,702 | 9/1974 | Bliss | 463/6 |
| 4,488,017 | 12/1984 | Lee | 463/38 |
| 5,139,261 | 8/1992 | Openiano . | |
| 5,229,756 | 7/1993 | Kosugi et al. | 345/156 |
| 5,334,997 | 8/1994 | Scallon | 345/167 |
| 5,552,807 | 9/1996 | Hayes et al. | 345/156 |
| 5,745,055 | 4/1998 | Redlich et al. | 341/20 |
| 5,812,114 | 9/1998 | Loop | 345/157 |
| 5,838,305 | 11/1998 | Bookstein | 345/163 |
| 5,907,318 | 5/1999 | Medina | 345/163 |

FOREIGN PATENT DOCUMENTS

| | | |
|---|---|---|
| 404077913A | 3/1992 | Japan . |
| 404242818A | 3/1992 | Japan . |
| 2038597 | 7/1980 | United Kingdom . |

*Primary Examiner*—Steven J. Saras
*Assistant Examiner*—Alecia D. Nelson
*Attorney, Agent, or Firm*—Dorsey & Whitney LLP

[57] ABSTRACT

One embodiment of the present invention comprises a foot operated device, which may be used by an operator, for inputting information into an electronic device. The foot operated device comprises a sensing pad support assembly, a sensing pad housing operably connected to the sensing pad support assembly and a sensing pad secured within the sensing pad housing for sensing a foot motion indicator, wherein the orientation of the sensing pad relative to the operator may be adjusted. The device may further comprise at least one actuator partially secured within the sensing pad housing for inputting information into the electronic device. The sensing pad may be a touch sensitive pad or a proximity sensitive pad. The sensing pad may be a capacitance-based sensing pad, a resistance-based sensing pad or an optical-based sensing pad.

48 Claims, 9 Drawing Sheets

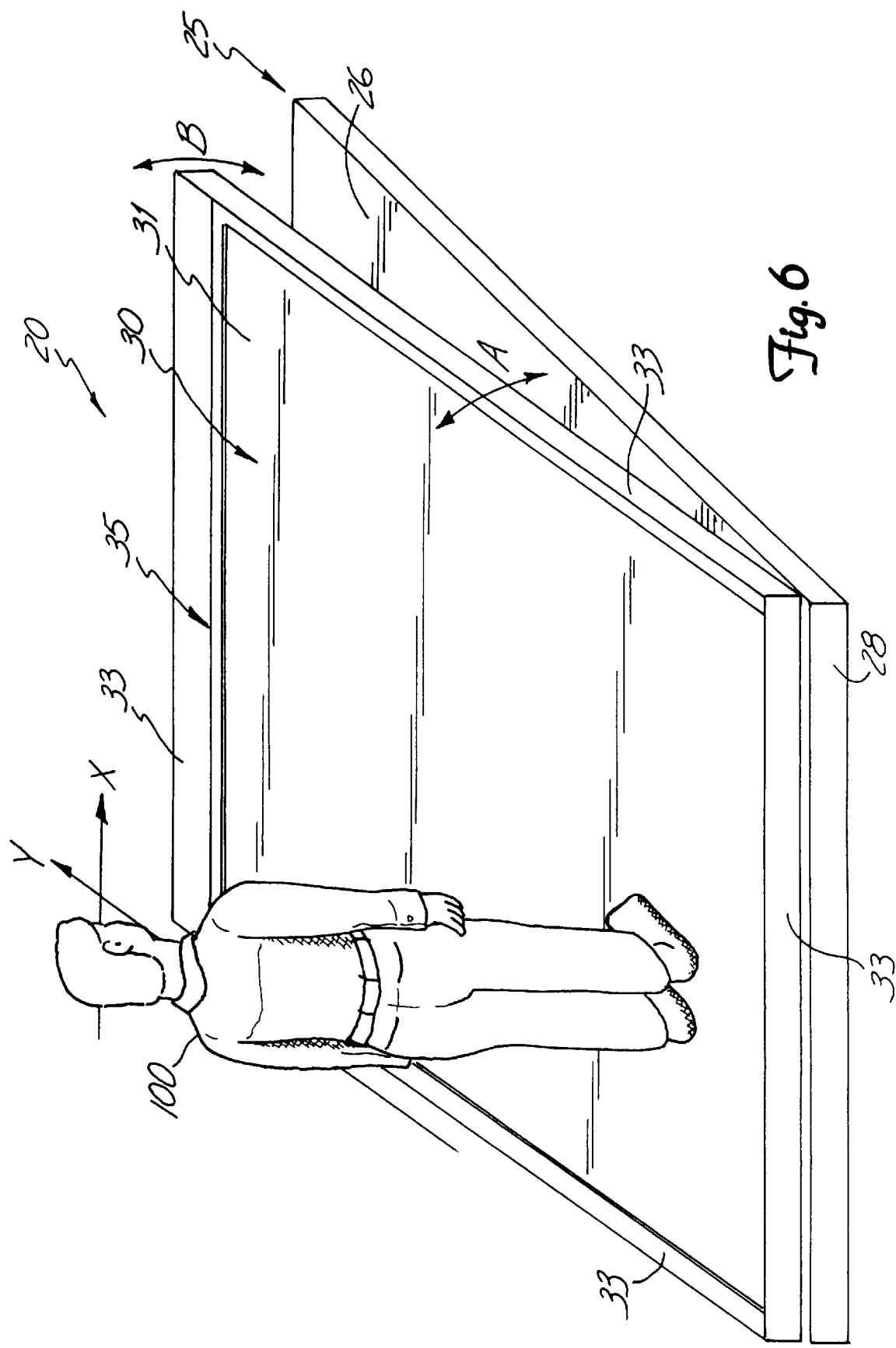

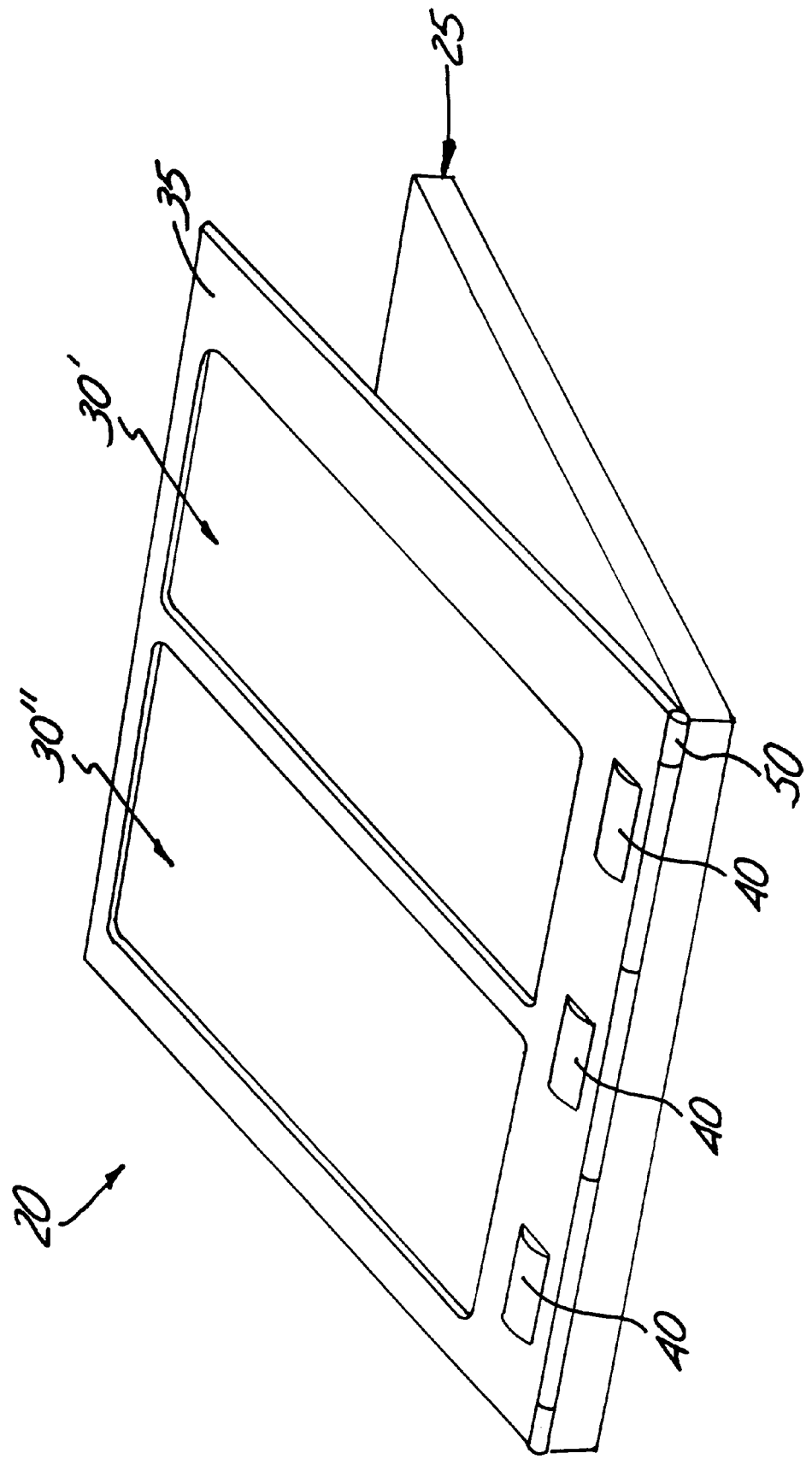

FOOT OPERATED INPUT DEVICE

BACKGROUND OF THE INVENTION

1. Field of the Invention

This invention relates generally to devices for inputting data or other information. More particularly, this invention relates to devices for inputting data or other information into electronic devices by computer operator foot motion. Specifically, this invention relates to foot operated computer input devices.

2. Description of the Prior Art

In the computer industry, the keyboard is the primary input device used by computer operators to manually input data or other information into a computer system. In many cases, however, a computer operator may find it relatively more convenient, efficient or even necessary to use a second manual input device, such as a "mouse" or a trackball, that operates as a pointer or positioner and as a selector (hereinafter referred to as a "manual pointing device"). Generally, manual pointing devices translate some movement of a computer operator's hand or fingers into data or other information that is input into the computer. The computer in turn translates this data or other information into the movement, positioning or selection of an object, item or icon on the computer screen (hereinafter referred to as "screen items"). For example, a manual pointing device may allow the computer operator to position the computer screen's cursor in specific locations or "sweep" an area on the computer screen more quickly and more accurately than a keyboard. Alternatively, a manual pointing device may allow the computer operator to quickly point to and select specific computer screen items.

There are, however, limitations to using manual pointing devices. For example, when using a manual pointing device the computer operator will usually remove at least one hand from the keyboard. Additionally, the computer operator may divert his or her gaze or attention from the keyboard or the computer screen when reaching for the manual pointing device. In most cases, these actions will force the computer operator to stop inputting data or other information into the computer via the keyboard. Thus, the use of a manual pointing device may decrease the rate at which data or other information is input into the computer. Additionally, some handicapped individuals may find it difficult or impossible to operate a manual pointing device. Finally, for some computer applications, particularly computer games, a computer operator may find it relatively more intuitive, efficient, or even necessary to use a non-manual pointing device to input data or other information into a computer.

Several types of foot operated input devices have been employed in the art. U.S. Pat. Nos. 5,177,473 and 5,552,807 both disclose foot operated electronic input devices. However, neither of the devices disclosed in these patents may operate as a pointing device, and therefore may be of limited use in most graphics sensing pad support assembly computer applications. Moreover, the components of these devices that translate the movement of the computer operator's foot into data or other information for the computer (the "translational components") ar e comprised of moving mechanical parts. Thus, the devices are subject to a relatively greater rate of mechanical malfunction than a device utilizing non-moving or passive translational components. These limitations may make these devices relatively expensive to operate.

The device disclosed in U.S. Pat. No. 5,334,997 (the "Scallon device") comprises a foot operated pointing device utilizing a trackball. While the Scallon device may be used as a pointer, the translational components of the Scallon device are also comprised of moving mechanical parts and subject to the same limitations described above. Additionally, the Scallon device may require the computer operator to perform relatively complex movements of his or her foot to frictionally engage and rotate the trackball. Again, these limitations may make the Scallon device or other similar devices relatively disadvantageous.

Thus there exists a need for foot operated input device, wherein the translational components of the device are not comprised of moving mechanical parts. Additionally, there exists a need for a foot operated input device that may operate as a pointer and as a selector. Furthermore, there exists a need for a foot operated input device that does not require relatively complex interaction between the computer operator's foot and the translational components of the device.

SUMMARY OF THE INVENTION

One embodiment of the present invention comprises a foot operated device, which may be used by an operator, for inputting information into an electronic device. This foot operated device comprises a sensing pad support assembly, a sensing pad housing operably connected to the sensing pad support assembly and a sensing pad secured within the sensing pad housing for sensing a foot motion indicator, wherein the orientation of the sensing pad relative to the operator may be adjusted. This device may further comprise at least one actuator partially secured within the sensing pad housing for inputting information into the electronic device. This sensing pad may be a touch sensitive pad or a proximity sensitive pad. This sensing pad may be a capacitance-based sensing pad, a resistance-based sensing pad or an optical-based sensing pad.

In an alternative embodiment, the foot operated device further comprises a foot transport assembly for moving a foot motion indicator relative to the sensing pad. The foot transport assembly may comprise at least one traveling rail operably connected to the sensing pad housing, a traveler slidably connected to at least one traveling rail and a platform slidably connected to the traveler, wherein the platform may slide parallel to one axis of an X-Y plane associated with the sensing pad and the traveler may slide parallel to the other axis of the X-Y plane.

DESCRIPTION OF THE DRAWINGS

FIG. 6 is a perspective view of yet another embodiment of the present invention.

FIG. 8 is a perspective view of yet another embodiment of the present invention.

DETAILED DESCRIPTION

First Embodiment

Figure 1:
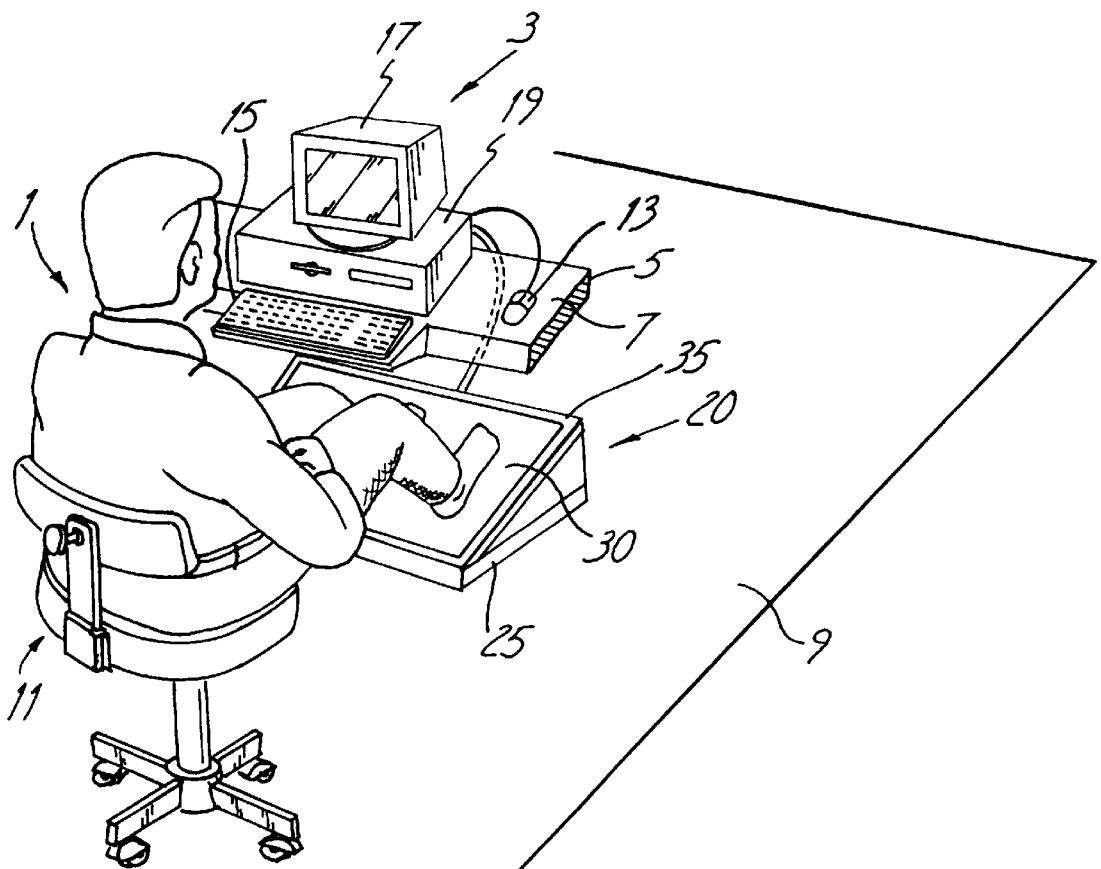
FIG. 1 is a perspective view of a computer operator using one embodiment of present invention to input data and other information into a computer system.

FIG. 1 illustrates the present invention in a typical computer system operating environment. In FIG. 1, a computer operator 1 is operating a computer system 3. Generally, the computer system 3 comprises a computer monitor or screen 17, a digital computer 19, a keyboard 15, a mouse 13 and a foot operated input device 20. In this environment, the computer screen 17, digital computer 19, keyboard 15 and mouse 13 are supported by a table or desk 5 having an upper horizontal surface or desk top 7. The desk top 7 is at an elevation above the floor 9 such that the computer operator 1 may position his or her legs and feet under the desk top 7 when the computer operator 1 is sitting in a chair 11.

The foot operated input device 20 may be placed on the floor 9 underneath the desk top 7 in a position such that the computer operator 1 may operate the foot operated input device 20. The computer operator 1 may operate the foot operated input device 20 by moving or positioning at least one of his or her feet, or other foot motion indicator, in proximity to, or in contact with, the foot operated input device 20. Hereinafter, a foot motion indicator shall mean, without limitation, a computer operator's foot, a computer operator's footwear (including, without limitation, socks and shoes designed or not designed to be used with the present invention) and any other tangible item that may be controlled, positioned, moved or guided by the computer operator's foot when the computer operator 1 is operating the foot operated input device 20.

Figure 2:
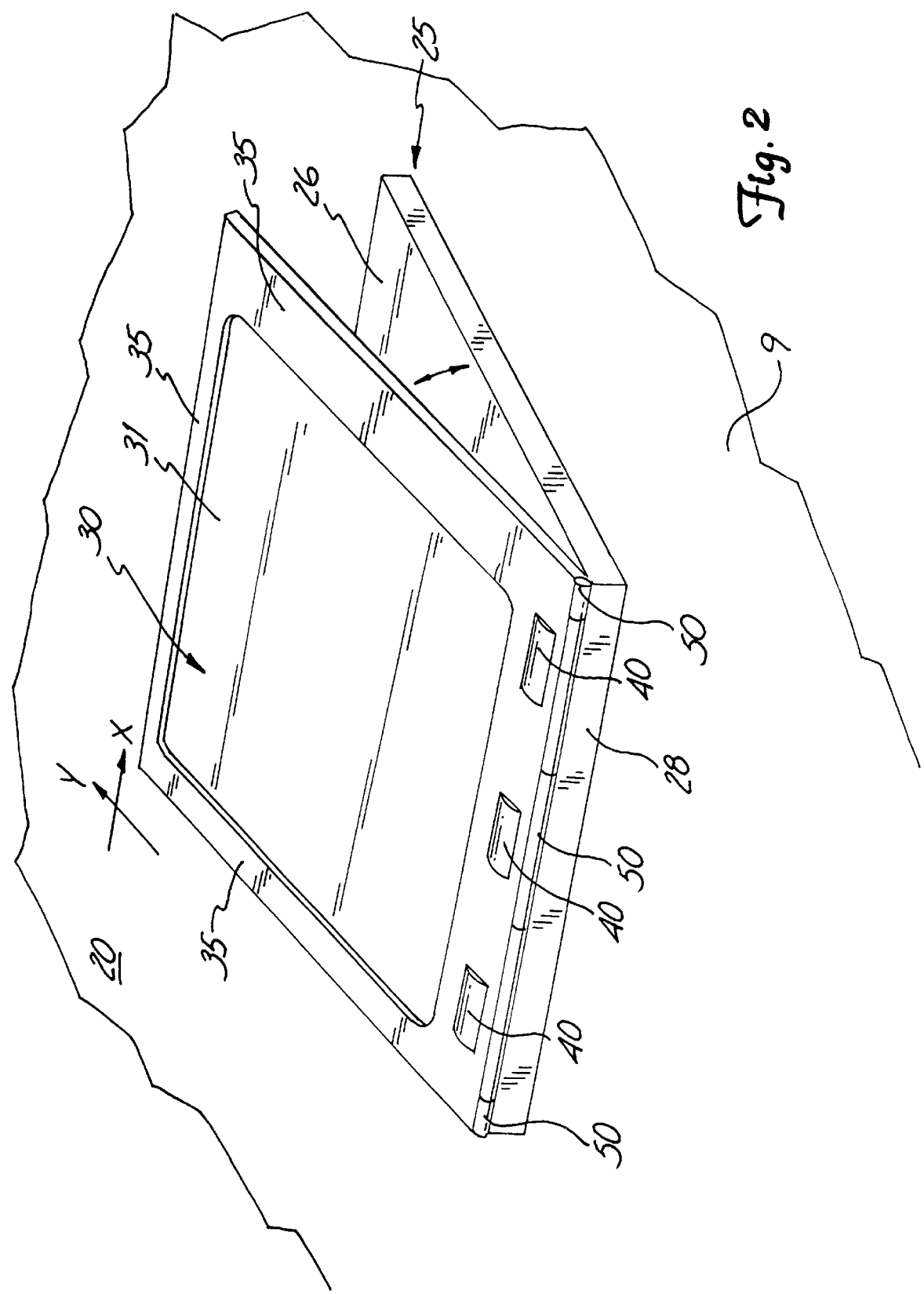
FIG. 2 is a perspective view of one embodiment of the present invention.
Figure 3:
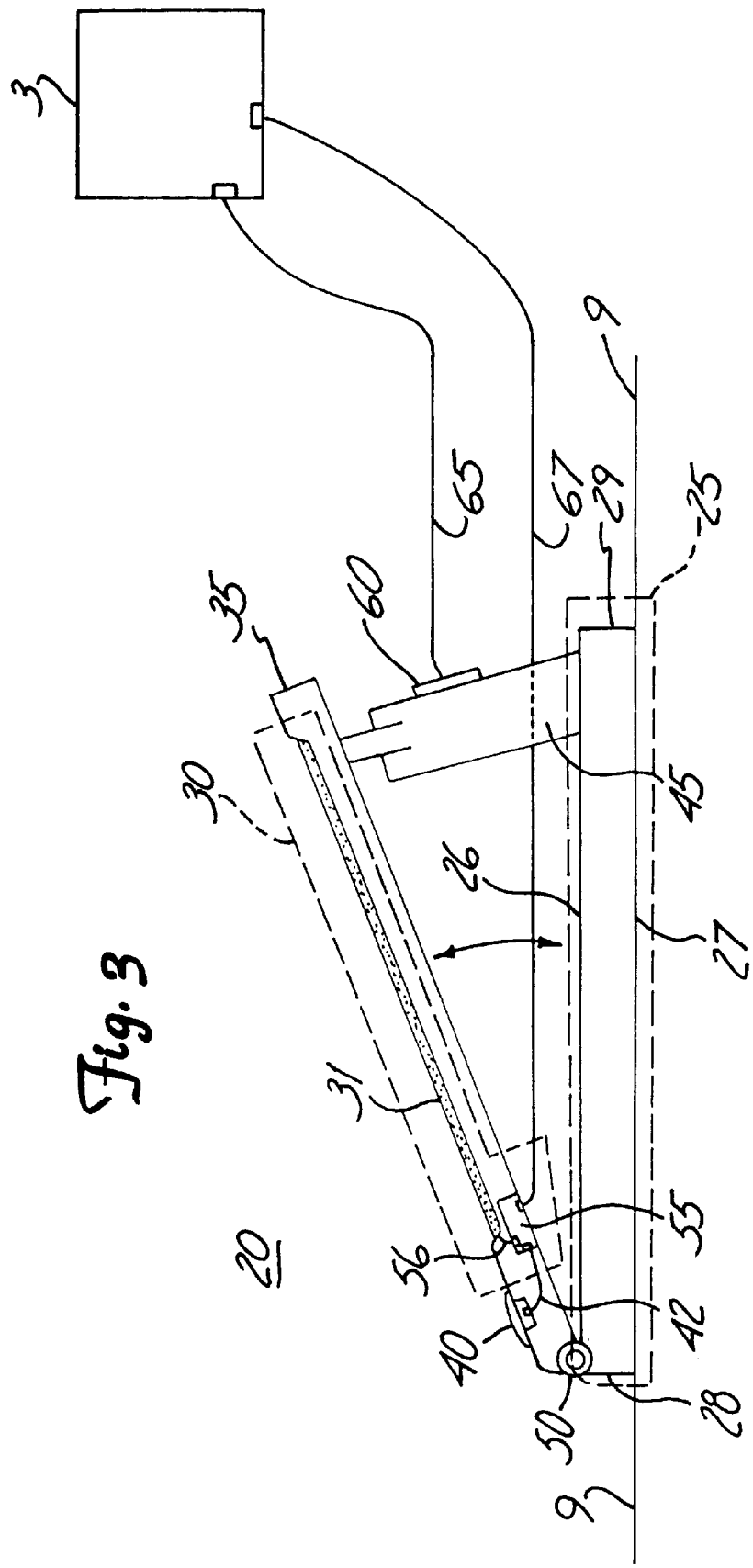
FIG. 3 is a side view of the embodiment of the present invention shown in FIG. 2.

Referring now to FIGS. 2 and 3, there is shown an embodiment of the present invention oriented in an X-Y plane. (In general, the present invention may be said to be associated with the X-Y plane in which it is oriented). In FIGS. 2 and 3, a foot operated input device 20 is shown generally comprising a sensing pad support assembly 25, a substantially planar sensing pad housing 35, a substantially planar sensing pad 30 and an angle adjusting assembly 45. The dimensions of the sensing pad support assembly 25, the sensing pad housing 35 and the sensing pad 30 may be selected in accordance with the desired application or operating environment of the foot operated input device 20. In the embodiment shown in FIGS. 2 and 3, the exposed area of the sensing pad 30 (i.e., the area of the sensing pad 30 that may be contacted by the computer operator 1) may be approximately 28 inches wide (measured in the X direction of the X-Y plane) and 20 inches long (measured in the Y direction of the X-Y plane). In this embodiment, the dimensions of the sensing pad support assembly 25 and the sensing pad housing 35 may be nominally larger than the dimensions of the exposed area of the sensing pad 30.

The sensing pad support assembly 25 of the foot operated input device 20 is comprised of an upper surface section 26, a lower surface section 27, a front section 28 and a rear section 29. In FIGS. 2 and 3, the sensing pad support assembly 25 is shown as substantially rectangular in shape, however, the sensing pad support assembly 25 may be formed in various other shapes, including substantially circular or triangular shapes.

In the embodiment shown in FIGS. 2 and 3 the sensing pad support assembly 25 for the foot operated device 20 is oriented such that the lower surface section 27 of the sensing pad support assembly 25 is substantially in contact with the floor 9. (The sensing pad support assembly 25 may, however, be positioned in a variety of orientations; i.e., the lower surface section 27 of the sensing pad support assembly 25 may be mounted or attached to a wall or a substantially vertical section of the desk 5). In this manner, the sensing pad support assembly 25 may stably maintain the foot operated device 20 in a particular position relative to the computer operator 1 as the computer operator 1 operates the foot operated input device 20.

The sensing pad housing 35 may be operably connected to the sensing pad support assembly 25 by a conventional pivot assembly 50. As shown in FIGS. 2 and 3, the sensing pad support assembly 25 and sensing pad housing 35 may be pivotally connected generally toward the front section 28 of the sensing pad support assembly 25. A wide variety of conventional pivot assemblies, such as hinge assemblies, may be used to operably connect the sensing pad housing 35 and the sensing pad support assembly 25. The components of the pivot assembly 50 may be integrally attached to both the sensing pad support assembly 25 and the sensing pad housing 35. As best shown in FIG. 3, the pivot assembly 50 allows the sensing pad 30 and the sensing pad housing 35 to be variably oriented at a plurality of angles relative to the sensing pad support assembly 25 (and relative to the Y axis).

At least partially secured within the sensing pad housing 35 is a substantially planar electronic or optical sensing pad 30. The sensing pad 30 comprises the translational components of the present invention. The sensing pad 30 may be comprised of sensing circuitry 31 and sensing pad control circuitry 55. The sensing pad 30 is secured within the sensing pad housing 35 such that the sensing circuitry 31 is relatively exposed to the computer operator 1 and the computer operator 1 may contact the sensing circuitry 31 with a foot motion indicator. The sensing pad 30 may be an appropriately dimension version of any of a variety of conventional proximity or touch sensitive pads that employ capacitance-based, resistance-based or opticalbased sensing technologies, such as Cirque's Glidepoint® sensing pad, Am Technologies' Super Elite® sensing pad or Silitek's Touchpad® sensing pad. While normally substantially planar, in view of the greater size of such a sensing pad 30 relative to conventional mouse pads and in view of the greater range of motion of a computer operator's feet relative to his or her hands, it may be advantageous to make the surface of sensing pad 30 either somewhat concave or somewhat convex (relative to the operator) to provide the computer operator 1 with additional kinesthetic clues about the position of a foot motion indicator under his or her control.

The sensing pad circuitry 31 may be designed to sense or detect movements or the location or position of a foot motion indicator relative to the sensing pad 30. The sensing pad circuitry 31 may also be designed to sense or detect the relative pressure exerted by a foot motion indicator upon the sensing pad circuitry 31. The sensing circuitry 31 may be operably connected to the sensing pad control circuitry 55 by connector 56. The sensing pad control circuitry 55 may monitor the sensing circuitry 31 for input data and other information (i.e., movements or the position of a foot motion indicators in proximity to, or in contact with, the sensing circuitry 31) and provide such data and information to the computer system 3 through connector 67.

A plurality of input actuators, such as buttons 40, may also be partially secured within the sensing pad housing 35. As shown in FIG. 2, the upper surface of the input buttons 40 may protrude a nominal distance from the upper surface of the sensing pad housing 35 such that the input buttons 40 may be physically detected by the computer operator 1. The input buttons 40 may be operated and may be programmed to perform and function similar to the buttons of a conventional manually operated mouse or trackball (e.g., to provide "click" action). The input buttons 40 may be operably connected to the sensing pad control circuitry 55 through connector 42. Alternatively, the input buttons 40 may be operably connected directly to the computer system 3.

As shown in FIG. 3, the angle at which the sensing pad housing 35 and the sensing pad 30 are oriented relative to the sensing pad support assembly 25 may be determined and controlled by the angle adjusting assembly 45. The angle adjusting assembly 45 may be operably secured to the upper surface section 26 of the sensing pad support assembly 25 and to the lower surface of the sensing pad housing 35. The angle adjusting assembly 45 may be comprised of conventional mechanical apparatus, which may be adjusted manually by the computer operator 1. Alternatively, as shown in FIG. 3, the angle adjusting assembly 45 may be an electromechanical or a pneumatic apparatus. In these embodiments, the angle adjusting assembly 45 may be adjusted manually by the computer operator 1, or through commands entered into the computer system 3 by the computer operator 1 via the keyboard 13, the mouse 15 or the foot operated input device 20 itself. The commands entered into the computer system 3 via these devices, may be sent to the angle adjusting assembly 45 by the computer system 3 through connector 65. Connector 65 may also provide power to the angle adjusting assembly 45.

In operation, a computer operator 1 may position the foot operated device 20 beneath the desk top 7, as shown in FIG. 1. Next, the computer operator 1 may adjust the angle at which the sensing pad housing 35 and sensing pad 30 are oriented relative to the sensing pad support assembly 25. The computer operator 1 may adjust this angle of the support assembly such that a foot motion indicator under the computer operator's control may be relatively easily and comfortably moved to any location on or above the entire sensing circuitry 31.

The computer operator 1 may input data and other information (e.g., computer screen cursor position information) into the computer system 3 via the foot operated input device 20 without removing his or her hands from the keyboard 15 and without diverting his or her gaze or attention from the keyboard 15 or the computer screen 17. To input data and other information, the computer operator 1 may simply move the foot motion indicator relative to the sensing circuitry 31. Depending upon the type of sensing pad 30 (e.g., capacitive-based, resistive-based or optical-based), the computer operator's foot or foot motion indicator under his or her control may be in contact with, or positioned slightly above (in proximity to), the sensing circuitry 31. The sensing circuitry 31 may sense the relative location or position of the foot motion indicator to the sensing circuitry 31 and translate this information into information for the computer system 3. Additionally, the input buttons 40 may be programmed to function in the same or similar manner to the buttons of a conventional manual pointing device (e.g., as screen item selectors).

Second Embodiment

Figure 4:
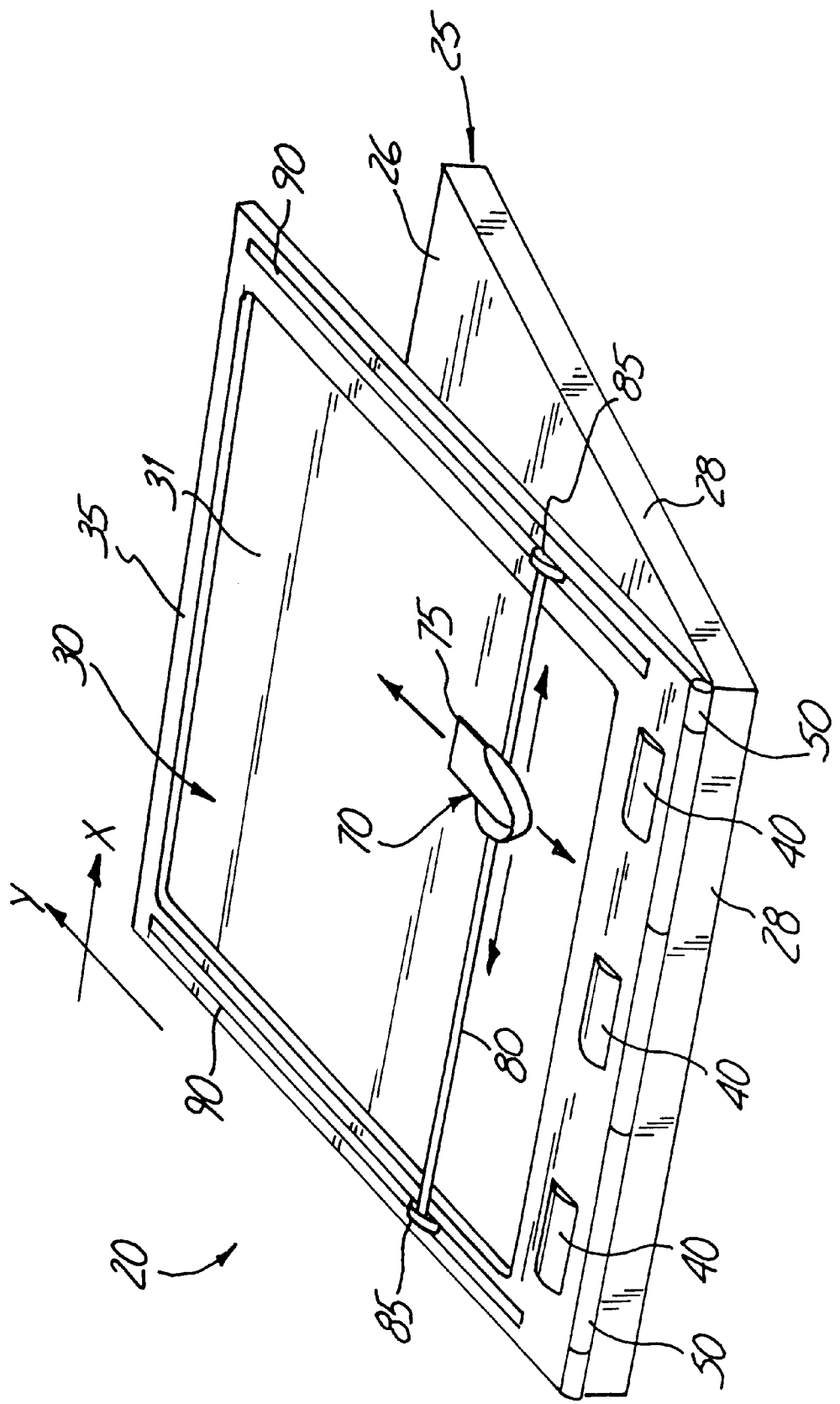
FIG. 4 is a perspective view of an embodiment of the present invention.

An alternative embodiment of the present invention is shown in FIG. 4. In FIG. 4, there is shown the foot operated device 20 of the first embodiment further comprising a foot transport assembly 70. Generally, the foot transport assembly 70 comprises at least one traveling rail 90 (two traveling rails 90 are shown in FIG. 4), a traveler 80 a nd a platform 75.

The traveling rails 90 may be a groove or slot integrally formed within or upon the sensing pad housing 35 or, alternatively, may be rail or track mounted upon the sensing pad housing 35. In the embodiment shown in FIG. 4, the traveling rails 90 are located on opposing sides of the sensing circuitry 31 and are gene rally oriented in parallel with the Y axis. The traveling rails 90 may, however, be generally oriented in parallel with the X axis. As shown in FIG. 4, the length of the traveling rails 90 (measured in the direction in which the traveling rail 90 is oriented) may be at least nominally greater than the length of the sensing circuitry 31 (if the traveling rails 90 are oriented in parallel with the Y axis) or the width of the sensing circuitry 31 (if the traveling rails 90 are oriented in parallel with the X axis).

As shown in FIG. 4, slidably connected to the traveling rails 90 is a traveler 80. The traveler 80 may be oriented such that it is substantially perpendicular to the traveling rails 90. The traveler may be oriented such that it is generally parallel to the X axis or Y axis (depending upon the orientation of the traveling rails 90). The length of the traveler 80 (measured in the direction in which the traveler 80 is oriented) may be at least nominally greater than the length of the sensing circuitry 31 (if the traveler 80 is oriented in parallel with the Y axis) or the width of the sensing circuitry 31 (if the traveler 80 is oriented in parallel with the X axis).

The traveler 80 may be slidably connected to the traveling rails 90 by a pair of opposing wheels or ball bearing assemblies 85. The wheels or ball bearing assemblies 85 may be operably mounted to the traveler 80 and operably engaged by the traveling rails 90 such that the computer operator may slide the traveler 80 along the entire length of the sensing circuitry 31 (measured in the Y direction). Slidably mounted upon the traveler 80 is a platform 75. The platform 75 may be mounted upon the traveler 80 by conventional wheel or ball bearing assemblies (not shown) such that the computer operator may slide the platform 75 along the entire length of the traveler 80 and, therefore, the width of the sensing circuitry 31. In this manner, the platform 75 may be positioned on or above the entire sensing circuitry 31.

As shown in FIGS. 5A–D, the platform 75 may be formed in a variety of shapes to receive a foot motion indicator under the control of the computer operator 1. Additionally, the platform 75 itself comprises a foot motion indicator. In operation, the computer operator 1 may place his or her foot in or on the platform 75. The computer operator 1 may then cause the platform 75 to travel along the traveler 80 in a direction parallel to the X axis, or cause the platform 75 and the traveler 80 to travel along the traveling rails 90 in a direction parallel to the Y axis. In this manner the platform 75 may traverse or cover the entire sensing pad 30.

The foot transport assembly 70 may perform several functions. In some cases, a particular foot motion indicator in contact with the sensing circuitry 31 may frictionally engage the sensing circuitry 31 to such an extent that the foot motion indicator may be difficult to move or position relative to the sensing circuitry 31. In these cases, the wheel or ball bearing assemblies of the foot transport assembly 70 may allow the computer operator 1 to move a foot motion indicator relative to the sensing pad 30 with relatively greater ease.

In some other cases, a computer operator 1 may find it difficult to keep a footrelated object in relatively constant proximity to, or relatively constant contact with, the sensing circuitry 31 (e.g., when "dragging" a screen item from one screen position to another), thereby affecting the accuracy of the device. In these cases, the structure of the foot transport assembly 70 may allow the platform 75 to travel over the entire sensing circuitry 31 at a relatively constant distance above, or in a relatively constant contact with, the sensing circuitry 31. Thus, any problems relating to the accuracy of the device may be diminished in these cases.

Figure 5A:
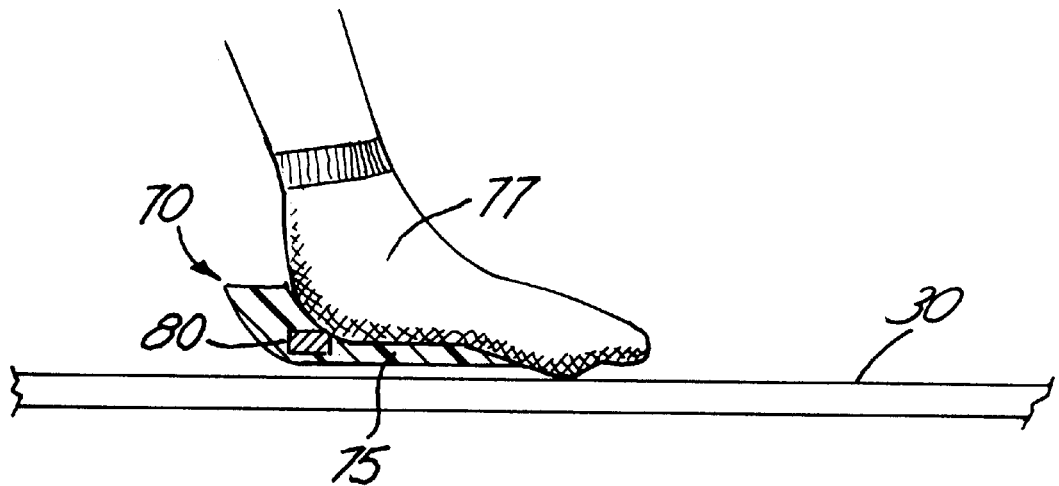
FIG. 5A–D are side views of the foot transport assembly shown in FIG. 4.

In still other cases, some types of sensing pads 30 may require the foot motion indicator to be relatively conductive in nature. Generally, a computer operator's naked foot may be of the requisite conductive nature to be sensed or detected by these types of sensing pads. However, for a variety of reasons, a computer operator 1 may find it undesirable to remove his or her footwear (such as shoes or socks which are usually non-conductive) while operating the foot operated input device 20. In these instances, as shown in FIG. 5A, the computer operator may wear a conductive covering 77 over the computer operator's normal footwear or over the computer operator's foot. Depending upon the position of the computer operator's foot on the platform 75, the conductive covering 77 may contact or be in relative proximity to the sensing pad 30 such that the conductive covering 77 may be sensed by the sensing pad 30. (This conductive covering 77 may also be used without the foot transport assembly).

Figure 5B:
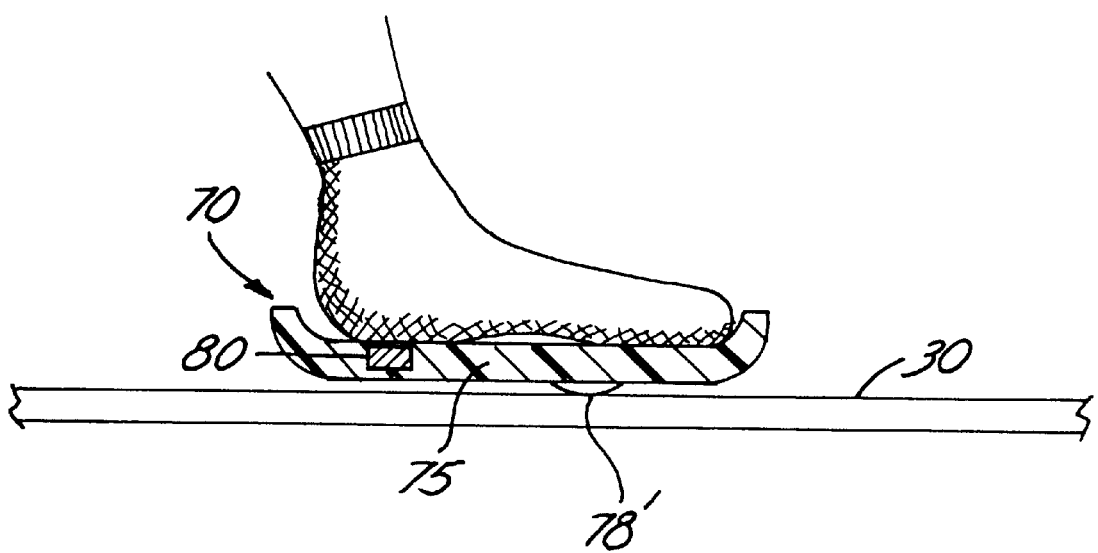
Figure 5C:
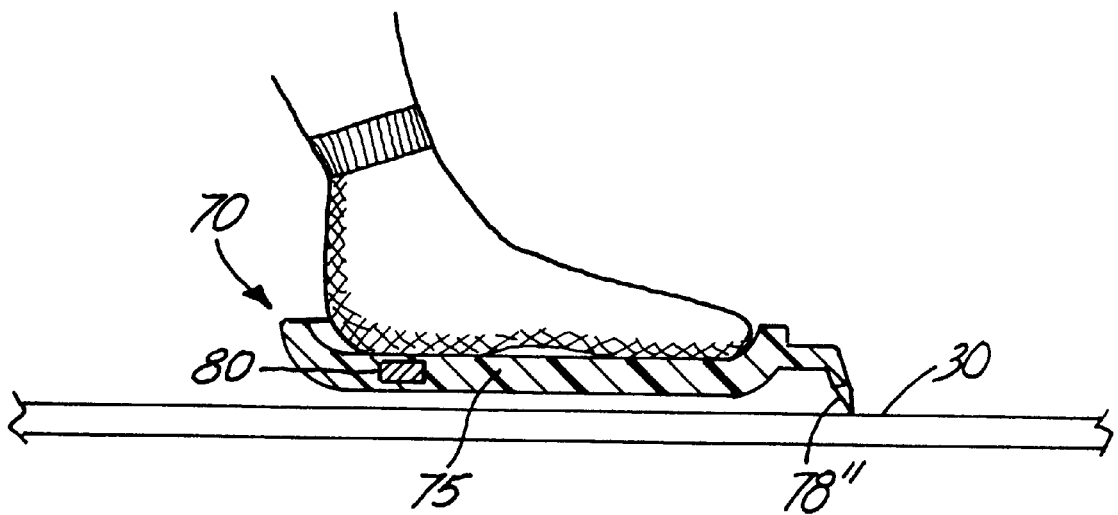
Figure 5D:
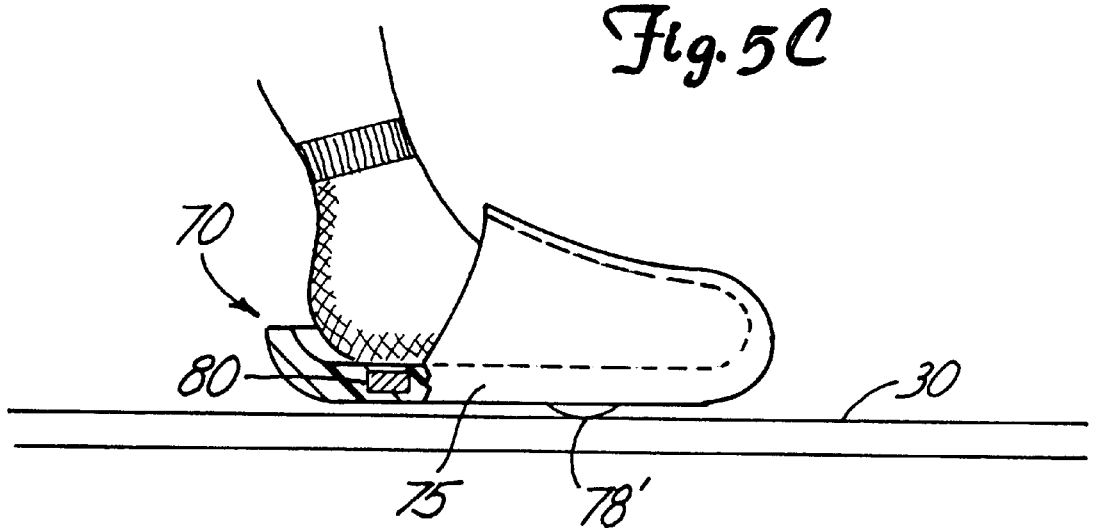

Alternatively, as shown in FIGS. 5B–D, the computer operator 1 may place his or her foot (with or without footwear) into or onto a platform 75 comprising a conductive element 78. The conductive element 78 may be any of a variety of shapes (including the downward facing halfsphere 78' shown in FIGS. 5B and 5D or the pointed element 78" of FIG. 5C) and may be integrally formed with the platform 75 such that it is positioned in contact with, or in relative proximity to, the sensing pad 30. Thus, the foot transport assembly 70 may allow the computer operator 1 to position certain types of foot motion indicators (e.g., foot motion indicators with varying conductivity and shapes) relative to the sensing pad 30.

Third Embodiment

Figure 7:
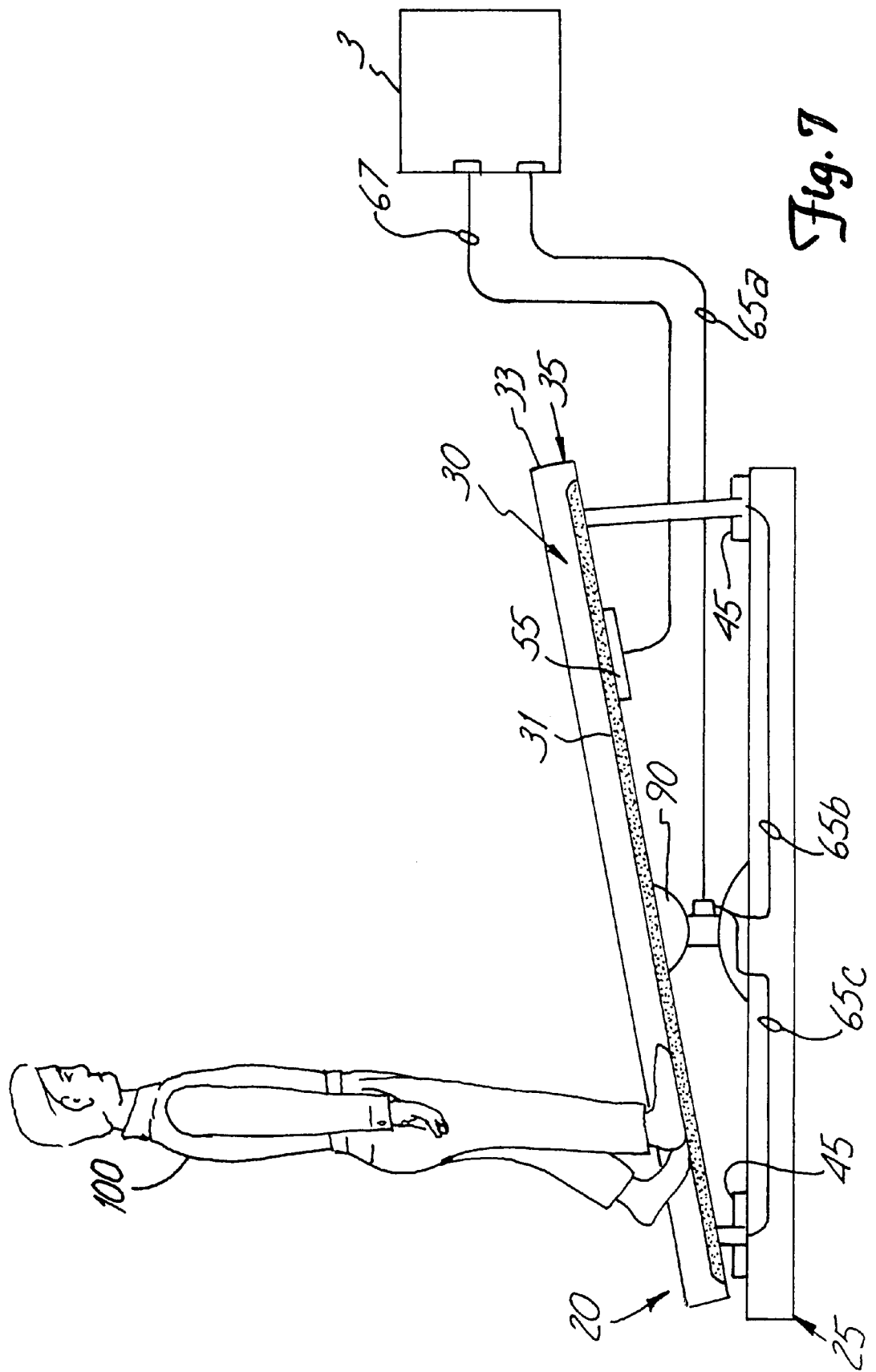
FIG. 7 is a side view of the embodiment of the present invention shown in FIG. 6.

Yet another embodiment of the present invention is shown in FIGS. 6 and 7. In FIGS. 6 and 7, there is shown an embodiment of the present invention wherein the operator 100 may input data or other information while standing upright supported on and generally on top of the exposed area of the sensing pad 30. Additionally, the sensing pad 30 may be continuously variably oriented in a variety of angles relative to the sensing pad support assembly 25 and to both the X and Y axes as shown by arrows A and B. This embodiment may be used with certain virtual reality environments, where relatively larger movements of the body may be desirable when inputting information into the computer system 3 or other electronic system.

The exposed area of the sensing pad 30 of this embodiment may be dimension such that the operator 100 may stand upon and move both feet relatively freely about the exposed area of the sensing pad 30. In the embodiment shown in FIG. 6, the exposed area of the sensing pad may be approximately 55 inches wide and 55 inches long. Additionally, the sensing pad housing 35 may comprise a guard rail 33 around the perimeter of the sensing pad housing 30 that operates to inform the operator 100 of the outer edges of the device.

As shown in FIG. 7, the sensing pad 30 and sensing pad housing 33 may be operably attached to the sensing pad support assembly 25 by a plurality of angle adjustment assemblies 45 and a pivot assembly 90. In this embodiment, commands sent by the computer system 3 (or any other electronic system) to the plurality of angle adjustment assemblies 45 and a pivot assembly 90 via connectors 65*a–c* may control the orientation of the sensing pad housing 35 and sensing pad 30 relative to both the X and Y axes (i.e., relative to the sensing pad support assembly 25). This variable orientation of the sensing pad housing 35 and sensing pad 30 relative to the X and Y axes may enhance certain virtual reality games.

In particular, with this embodiment, the sensing pad 30 may be configured such that position and motion information may be sensed, roughly contemporaneously, at two positions; one for each foot supported on the sensing pad 30. Thus, the sensing pad of this embodiment can provide additional input information that may be used in applications where foot motion and position from both feet is of interest or use. The sensor pad could also be weight sensitive to provide information on the balance of the supported person.

From the foregoing description, it will be apparent that modifications can be made to the foot operated input device and method for using same without departing from the teachings of the present invention. For example, as shown in FIG. 8, the foot operated device 20 may comprise a plurality of sensing pads 30' and 30" each receiving one foot motion indicator and each providing pointing and selection capabilities. Accordingly, the scope of the invention is only limited as necessitated by the accompanying claims.

What is claimed is:

1. A foot operated device, usable by an operator, for inputting information into an electronic device, comprising:
    (a) a continuous sensing pad for sensing a foot motion indicator that is movable to a plurality of positions relative to the sensing pad, wherein the sensing pad comprises:
        (i) sensing circuitry for sensing the position of the foot motion indicator relative to the sensing pad; and
        (ii) sensing pad control circuitry for monitoring the sensing pad control circuitry and for providing information associated with the position of the foot motion indicator to the electronic device; and
    (b) a support assembly for the sensing pad, said support assembly being selectively positionable so that the orientation of the sensing pad relative to the operator is adjustable.

2. The device of claim 1 further comprising at least one actuator partially secured within the support assembly for inputting information into the electronic device.

3. The device of claim 1 wherein the sensing pad is a touch sensitive pad.

4. The device of claim 1 wherein the sensing pad is a proximity sensitive pad.

5. The device of claim 1 wherein the sensing pad is a capacitance-based sensing pad.

6. The device of claim 1 wherein the sensing pad is a resistance-based sensing pad.

7. The device of claim 1 wherein the sensing pad is an optical-based sensing pad.

8. The device of claim 1 further comprising a housing assembly for the sensing pad, wherein the housing assembly is pivotally mounted to the sensing pad support assembly.

9. The device of claim 1 wherein the electronic device is a digital computer.

10. The device of claim 1 wherein the foot motion indicator is a conductive shoe.

11. The device of claim 1 further comprising a foot transport assembly for moving the foot motion indicator relative to the sensing pad.

12. The device of claim 11 wherein the foot motion indicator is a conductive element operably connected to the foot transport assembly.

13. The device of claim 11 further comprising:
    (a) a housing assembly for supporting the sensing pad; and
    (b) a foot transport assembly, comprising:
        (1) at least one traveling rail operably connected to the sensing pad housing;

(2) a traveler slidably connected to the at least one traveling rail; and (3) a platform slidably connected to the traveler;

wherein the platform may slide parallel to one axis of an X-Y plane associated with the sensing pad and the traveler may slide parallel to the other axis of the X-Y plane.

14. The device of claim 1 wherein the sensing pad is substantially planar.

15. The device of claim 1 wherein portions of the sensing pad are substantially planar, wherein portions of the sensing pad are not substantially planar, and wherein the not substantially planar portions provide kinesthetic clues about the position of the foot motion indicator to the operator.

16. The device of claim 1 further comprising a second sensing pad.

17. The device of claim 1 wherein the sensing pad may detect more than one foot motion indicator.

18. A computer system comprising;
(a) a digital computer; and
(b) a continuous, foot operated sensing pad comprising:
  (1) sensing circuitry for sensing the position of a foot motion indicator relative to the sensing pad, wherein the foot motion indicator is movable to a plurality of positions relative to the sensing pad; and
  (2) sensing pad control circuitry for monitoring the sensing circuitry and for providing information associated with the position of the foot motion indicator to the digital computer.

19. The device of claim 18 further comprising at least one actuator operably connected to the foot operated sensing pad for inputting information into the digital computer.

20. The device of claim 18 wherein the sensing pad is a touch sensitive pad.

21. The device of claim 18 wherein the sensing pad is a proximity sensitive pad.

22. The device of claim 18 wherein the sensing pad is a capacitance-based sensing pad.

23. The device of claim 18 wherein the sensing pad is a resistance-based sensing pad.

24. The device of claim 18 wherein the sensing pad is an optical-based sensing pad.

25. The device of claim 18 wherein the foot motion indicator is a conductive shoe.

26. The device of a claim 18 further comprising a foot transport assembly for moving the foot motion indicator relative to the sensing pad.

27. The device of claim 26 wherein the foot motion indicator is a conductive element operably connected to the foot transport assembly.

28. The device of claim 26 further comprising a sensing pad housing for supporting the sensing pad and wherein the foot transport assembly comprises:
  (a) at least one traveling rail operably connected to the sensing pad housing;
  (b) a traveler slidably connected to the at least one traveling rail; and
  (c) a platform slidably connected to the traveler;
  wherein the platform may slide parallel to one axis of an X-Y plane associated with the sensing pad and the traveler may slide parallel to the other axis of the X-Y plane.

29. The computer system of claim 18 further comprising:
(a) a computer screen; and
(b) a manual pointing device;
wherein the information may be input to the computer system by the manual pointing device or the foot operated sensing pad.

30. The device of claim 18 wherein the sensing pad is substantially planar.

31. The device of claim 18 wherein the sensing pad comprises substantially planar portions and portions that are not substantially planar, and wherein the not substantially planar portions provide kinesthetic clues about the position of the foot motion indicator to the operator.

32. The device of claim 18 further comprising a second sensing pad.

33. The device of claim 18 wherein the sensing pad may detect more that one foot motion indicator.

34. A electronic device, usable by an operator, comprising:
(a) a screen capable of displaying screen items; and
(b) a continuous, foot operated sensing pad for pointing to the screen items on the screen comprising:
  (1) a support assembly for the sensing pad;
  (2) a foot motion indicator that is movable to a plurality of locations relative to the sensing pad;
  (3) sensing circuitry for sensing the location of the foot motion indicator relative to the sensing pad; and
  (3) sensing pad control circuitry for monitoring the sensing circuitry and for translating the location of the foot motion indicator relative to the sensing pad into information for the electronic device.

35. The device of claim 34 wherein the foot operated sensing pad further comprises at least one actuator for selecting a screen item.

36. The device of claim 34 wherein the sensing pad is a touch sensitive pad.

37. The device of claim 34 wherein the sensing pad is a proximity sensitive pad.

38. The device of claim 34 wherein the sensing pad is a capacitance-based sensing pad.

39. The device of claim 34 wherein the sensing pad is a resistance-based sensing pad.

40. The device of claim 34 wherein the sensing pad is an optical-based sensing pad.

41. The device of claim 34 wherein the electronic device is a digital computer.

42. The device of claim 34 wherein the foot motion indicator is a conductive shoe.

43. The device of claim 34 further comprising a foot transport assembly for moving the foot motion indicator relative to the sensing pad.

44. The device of claim 43 wherein the foot motion indicator is a conductive element operably connected to the foot transport assembly.

45. The device of claim 44 wherein the foot transport assembly comprises:
  (a) at least one traveling rail operably connected to the sensing pad;
  (b) a traveler slidably connected to the at least one traveling rail; and
  (c) a platform slidably connected to the traveler;
  wherein the platform may slide parallel to one axis of an X-Y plane associated with the sensing pad and the traveler may slide parallel to the other axis the an X-Y plane.

46. The device of claim 34 wherein the sensing pad is substantially planar.

47. The device of claim 34 wherein the sensing pad comprises substantially planar portions and portions that are not substantially planar, and wherein the not substantially planar portions provide kinesthetic clues about the position of the foot motion indicator to the operator.

48. The device of claim 34 further comprising a second sensing pad.

* * * * *